A. M. HAMILTON.
TRANSMISSION LEVER LOCKING DEVICE.
APPLICATION FILED MAY 16, 1921.
1,421,463.
Patented July 4, 1922.
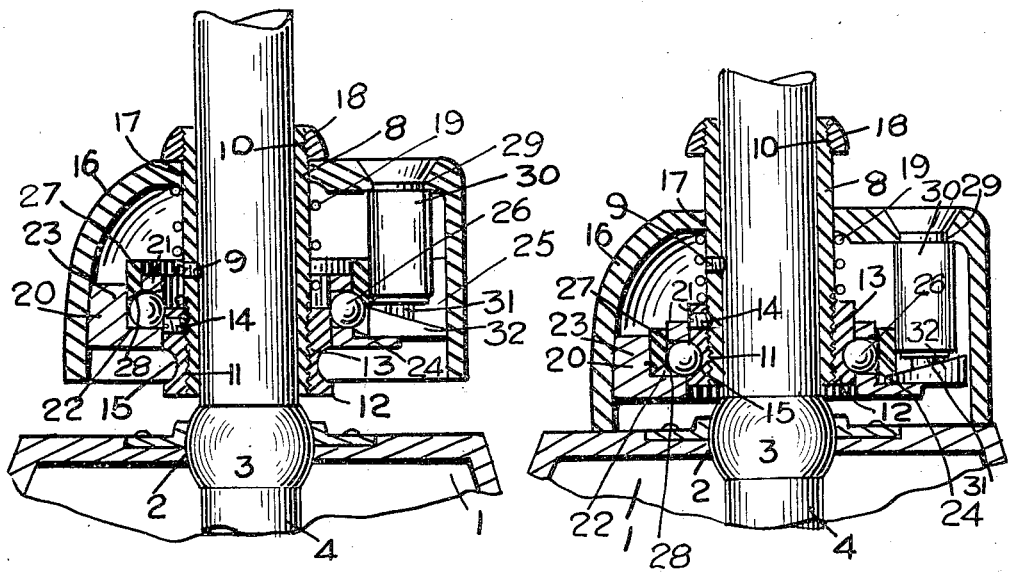
FIG.1.
FIG.2.
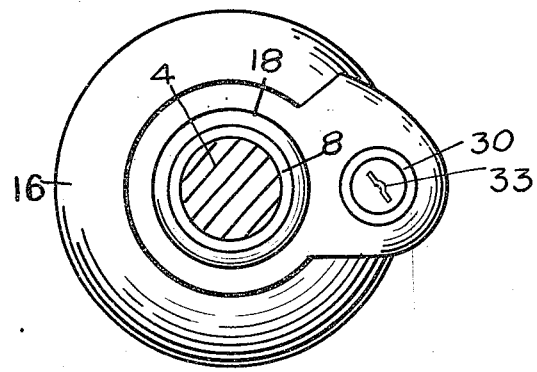
FIG 3
INVENTOR
ALEXANDER M HAMILTON

UNITED STATES PATENT OFFICE.

ALEXANDER MACDOWALL HAMILTON, OF TORONTO, ONTARIO, CANADA.

TRANSMISSION-LEVER-LOCKING DEVICE.

1,421,463. Specification of Letters Patent. Patented July 4, 1922.

Application filed May 16, 1921. Serial No. 469,991.

*To all whom it may concern:*

Be it known that I, ALEXANDER MACDOWALL HAMILTON, a subject of the King of Great Britain, and a resident of the city of Toronto, in the county of York, in the Province of Ontario, Canada, have invented certain new and useful Improvements in Transmission-Lever-Locking Devices, of which the following is the specification.

My invention relates to improvements in transmission lever locking devices and the object of the invention is to devise a simple, efficient and positive means for locking the transmission lever in a stationary position so that it cannot be operated by an unauthorized person and at the same time to provide a lock which will automatically engage in the locking position without the employment of a key and which is unlocked by key operated mechanism and it consists essentially of the arrangement and construction of parts as hereinafter more particularly explained.

Fig. 1 is a sectional view through my locking device and the upper portion of the transmission casing and showing the transmission lever, the parts of the locking mechanism being shown in the unlocked position prior to the withdrawal of its key.

Fig. 2 is a similar view to Fig. 1 showing the parts in the locked position.

Fig. 3 is a plan view of my lever locking device.

In the drawings like characters of reference indicate corresponding parts in each figure.

1 indicates the upper portion of a transmission housing of an automobile and in which is located the receiving socket 2 in which is supported the spherical portion 3 of the transmission lever 4. 8 indicates a sleeve which is secured to the upper portion of the transmission lever just above the spherical portion 3. 9 is a rivet by which the sleeve 8 is secured in position. The sleeve 8 is provided at its upper end with an externally threaded portion 10 and at its lower end with an externally threaded portion 11. 12 is a collar provided with an internal thread 13 which is screwed on the external thread 11 of the sleeve 8. The collar 12 is secured in position by a grub screw 14 which engages the sleeve 8. 15 is an annular groove formed in the collar 12 in proximity to its lower edge. 16 is a bell provided in its upper wall with an orifice 17 through which the sleeve 8 extends. 18 is a nut which is screwed onto the externally threaded portion 10 of the sleeve 8. 19 is a compression spring which extends between the upper end of the collar 12 and the opposing inner face of the upper wall of the bell 16.

20 is an annular member which is forced into the bell 16 so as to be secured therein. The inner edge of the annular member is turned up to form an annular flange 21 and an intermediate annular channel 22 between the flange and the outer wall portion 23 of the annular member 20. 24 are orifices formed in the annular flange 21, the lower edge of such orifice being flush with the bottom of the annular channel 22. 25 is a recess formed in the annular member 20 for a purpose which will hereinafter appear. 26 are balls preferably made of hardened steel adapted to fit into the orifice 24 and into the annular recess 15 when the locking device is in the locking position. 27 is a ring which fits into the recess 22 and is slidable vertically within such recess. The lower edge of the ring 27 is bevelled inwardly at 28, such bevelled portion bearing upon the upper outer peripheral portions of the balls 26. 29 is an orifice formed in the upper wall of the bell 16 and in which is secured a suitable barrel lock 30 such as a Yale lock, the lock depending into the bell and provided at its lower end with a spindle 31. 32 is a face cam which is in the form of a circular disc having its upper face inclined from one side to the other for a purpose which will hereinafter appear.

Having described the principal parts involved in my invention I will briefly describe the operation of the same.

In order to unlock the transmission lever a key is inserted in the key orifice 33 of the barrel lock 30. By turning the key the face cam 32 is turned a half turn so that the high portion of the cam is gradually carried beneath the lower edge of the ring 27 lifting it vertically. The channel 22 of the annular member 20 forms a guide for the ring 27 preventing any binding action of the ring during its upward movement. As soon as the ring 27 is raised, the spring 19 serves to force the bell 16 upward upon the sleeve 8, the balls 26 being forced outward so that their outer peripheral portions project into the channel 22 and their inner peripheral portions are clear of the annular recess 15. The bell is then carried upward by the spring 19, the balls rolling in contact with the outer periphery of the collar 12 and assuming the position shown in Fig. 1.

In order to withdraw the key it must be given a half turn, returning it to its normal position and carrying the face cam also to its normal position. When it is desired to relock the transmission lever all it is necessary to do is for the operator to press his foot down upon the bell 16 forcing it downward against the pressure of the spring 19 until the lower edge of the bell is carried into contact with the upper face of the transmission housing 1. When in this position the balls 26 are carried opposite to the annular recess 15 the annular ring 27 dropping by gravity, and the inwardly bevelled lower edge of the ring forcing the balls inward into engagement with the recess 15. The ring 27 then passes further downward so that its inner vertical face is in contact with the outer peripheral portions of the balls effectually locking them within the recess 15.

From this description it will be seen that I have devised a very simple, positive lock for a transmission lever which will be strong and durable and in which there is practically nothing which can get out of order.

It may be found necessary to adjust the position of the collar 12 upon the threaded portion of the sleeve 8 in order that my transmission lock may be adapted to suit various types of transmission housings. In order to do this all that is required is to remove the grub screw 14 and screw the collar 12 to the desired position and then reinsert the grub screw.

What I claim as my invention is—

1. In a transmission lever locking device, the combination with a transmission housing and a transmission lever carried by the housing so as to swing, of a ball engaging member carried in a stationary position upon the transmission lever, a ball carrier movable longitudinally of the lever, a ball carried by the ball carrier, a bell also movable longitudinally of the lever and in unison with the ball carrier, resilient means for holding the bell in the unlocked position, a gravity member bearing downwardly upon the outer peripheral portion of the ball and adapted to force the ball inwardly from the carrier and hold it in engagement with the ball engaging member, and key operated means for raising the gravity member upward out of contact with the ball.

2. In a transmission lever locking device, the combination with a transmission housing and a transmission lever carried by the housing so as to swing, of a ball engaging member secured in a stationary position upon the transmission lever and having a ball engaging recess therein, a ball carrier carried upon the ball engaging member and movable longitudinally of the transmission lever and having orifices therein, balls fitting freely within each orifice, a bell movable longitudinally of the transmission lever and in unison with the ball carrier, a gravity ring surrounding the ball carrier and having an inwardly bevelled lower edge adapted to bear against the upper outer peripheral portion of the balls when in the unlocking position, and to bear against the outer portions of the balls to hold them in the ball receiving recess when in the locking position, a compression spring inserted between the bell and the ball engaging member, and key operated means for raising the gravity member to release the balls.

3. In a transmission lever locking device, the combination with a transmission housing and a transmission lever carried by the housing so as to swing, of a ball engaging member secured in a stationary position upon the transmission lever and having a ball engaging recess therein, a ball carrier carried upon the ball engaging member and movable longitudinally of the transmission lever and having orifices therein, a ball fitting freely within each orifice, a bell movable longitudinally of the transmission lever and in unison with the ball carrier, a gravity ring surrounding the ball carrier and having an inwardly bevelled lower edge adapted to bear against the upper outer peripheral portion of the balls when in the unlocking position, and to bear against the outer portions of the balls to hold them in the ball receiving recess when in the locking position, a compression spring inserted between the bell and the ball engaging member, a turnable disc member having its upper cam face inclined from one side to the other and in contact with the lower edge of the gravity member, and key operated means for turning such disc to raise the gravity member.

4. In a transmission lever locking device, the combination with a transmission housing and a transmission lever carried by the housing so as to swing, of a ball engaging member carried by the transmission lever, a spring pressed bell movable longitudinally towards the housing against such spring pressure, a ball, means automatically operated simultaneously with the movement of the bell towards the housing for carrying the ball into engagement with and holding it in contact with the ball engaging member, and key operated means for releasing such holding means.

5. In a transmission lever locking device, the combination with a transmission housing and a transmission lever, of a ball engaging member carried by the lever, ball carrying means located between the ball engaging member and the lever, balls carried by the ball carrying member and adapted to engage and prevent longitudinal movement of the ball engaging member in relation to the lever, and key operated means adapted when released to move the balls inward into their locking position and when actuated to free balls to move outward to their unlocking position.

ALEXANDER MACDOWALL HAMILTON.